United States Patent [19]

Noland

[11] 4,233,041
[45] Nov. 11, 1980

[54] BAGHOUSE WITH ROTATING SWEEP ARM

[76] Inventor: Richard D. Noland, 1900 W. 47th Pl., Suite 308, Shawnee Mission, Kans. 66205

[21] Appl. No.: 38,513

[22] Filed: May 14, 1979

[51] Int. Cl.³ .............................................. B01D 46/04
[52] U.S. Cl. ...................................... 55/287; 55/294
[58] Field of Search ................ 55/284, 286, 287, 294, 55/302; 210/411

[56] References Cited

U.S. PATENT DOCUMENTS

| 2,650,674 | 9/1953 | Thrailkill | 55/294 |
| 3,280,980 | 10/1966 | King | 55/284 |
| 3,430,419 | 3/1969 | Reinecke et al. | 55/302 |
| 3,487,609 | 1/1970 | Caplan | 55/302 |
| 3,646,595 | 2/1972 | Williams | 55/284 |
| 3,957,639 | 5/1976 | Schoen et al. | 55/294 |
| 4,082,524 | 4/1978 | Noland | 55/294 |

FOREIGN PATENT DOCUMENTS 748164  4/1956  United Kingdom ...................... 55/287

*Primary Examiner*—David L. Lacey
*Attorney, Agent, or Firm*—Lowe, Kokjer, Kircher, Wharton & Bowman

[57] ABSTRACT

A cleaning arm for a cylindrical baghouse pivoting centrally of the clean air plenum with a cam controlled valve to provide backflushing air to successive concentric rings of filter bags with each full revolution of the cleaning arm.

7 Claims, 7 Drawing Figures

BAGHOUSE WITH ROTATING SWEEP ARM

BACKGROUND AND SUMMARY OF THE INVENTION

This invention relates to dust control equipment and, more particularly, to a cylindrical baghouse equipped with a rotor cleaning head to isolate and clean filter bags.

Continuous emphasis on environmental quality has resulted in increasingly strenuous regulatory controls on industrial emissions. One technique which has proven highly efficient in controlling air pollution has been the separation of undesirable particulate matter from a gas stream by fabric filtration.

Such filtration is carried out in dust collection equipment known in the trade as a "baghouse" which operates on the same general principle as an ordinary household vacuum cleaner, except on a much larger scale. Basically, the baghouse includes a sheet metal housing divided into two chambers, referring to as plenums, by a tube sheet having a plurality of vertically arranged fabric tubes or bags. A particle-laden gas stream, induced by the action of a fan, flows into the dirty air plenum wherein dust accumulates on the cloth bag as the bag passes through the fabric into the clean air plenum and out the exhaust. Continuous operation of the unit causes a cake of dust to build up on the bags which, unless removed, will reduce and eventually stop the flow of gas through the filters. Cleaning may be accomplished by backflushing the filters with cleaning air, thereby dislodging the dust cake from the bags to fall to the bottom of the dirty air plenum for subsequent removal.

Baghouses to which this invention particularly relates are cylindrical in shape with a cone shaped lower section for collection of the dust cake. These baghouses are normally characterized in the industry as small or bag houses, as opposed to larger versions which are usually rectangularly shaped with a lower hopper section for collection of the dust cake.

In the cylindrical type baghouse, the bags are arranged in concentric rings successively outwardly from the longitudinal axis of the baghouse. Cleaning is achieved by a rotating sweep arm centrally pivoted within the clean air plenum to rotate over the tube sheet. Blow back air, delivered along the length of the sweep arm, simultaneously backflushes the bags lying on a common radial from the center of the tube sheet. This cleaning technique necessarily limits the size and capacity of the baghouse since the bags in the outer rings must be aligned on a radial from the longitudinal axis of the baghouse with the bags forming the interior rings. In other words, the space between adjacent bags in each successive outer ring gets increasingly larger. If such spaces are used to accommodate additional filter bags, such bags can not lie on a radial with any bags forming the inner rings and, therefore, it is necessary to provide a sweep arm with multiple cleaning heads in order to clean bags having various geometric arrangements on the tube sheet.

Both of the foregoing two alternative approaches to geometric layout of the filter bags, with their attendant cleaning mechanisms, are commercially available. In one type of unit, the filters are aligned on common radials from the center of the bagouse and an air blow back manifold rotates 360° around the central axis of the baghouse to sweep the tube sheet area. Cleaning air is provided the full length of the manifold in order to clean simultaneously the full radius of the tube sheet so that all bags are cleaned with each complete revolution of the sweep arm. The amount of blow back air required by this arrangement must therefore be sufficient to clean at one time all on a common radial along the entire length of the sweep arm. As previously mentioned, however, such geometric spacing of bags does not effectively utilize the space between adjacent filters in the outermost concentric ring of bags.

An alternative commercial unnit arranges bags in the outermost concentric rings to more effectively utilize this area, but such bags do not lie on common radials with the filter bags in the inner rings of bags. This being the case, therefore, it is necessary to provide one cleaning head to clean the inner several rings of bags with one geometric layout and a second cleaning head to clean the outermost rings of bags with a different geometric layout. The cleaning system itself must have sufficient capacity to provide cleaning air to multiple numbers of bags at the same time.

There remains a need for a cylindrical baghouse effectively utilizing the amount of tube sheet area available for filters and for a system to efficiently and economically clean such filters. The primary goal of the present invention is to meet this need.

More specifically, an object of the invention is to provide a cylindrical filter unit wherein the filter bags may be arranged in concentric rings about the center of the tube sheet without the constraint of aligning the filters on common radials. In this fashion, filters in the outermost rings can be arranged sufficiently close together to achieve the maximum number of filters without regard to alignment of the filters with any filters forming the interior rings. Thus, the entire surface area of the tube sheet is available for use in arranging filter bags to maximize the filtering capacity of the unit.

Another object of the invention is to provide a cylindrical baghouse wherein the filter bags are cleaned one at a time in order to maximize cleaning efficiency. As a corollary hereof, significant economies are achieved in sizing the cleaning system to clean one bag at a time, as opposed to multiple bag cleaning systems.

An additional object of the invention is to provide a cylindrical baghouse of the character described wherein a cleaning manifold is pivotally mounted to rotatably sweep the surface of the tube sheet. The manifold is equipped with a valving mechanism to deliver blow back air to only one of the concentric rings of filters during one complete revolution of the sweep arm in order to clean, one at a time, the filter bags comprising that particular concentric ring of filters. Additionally, the valve mechanism is controlled by cam means to cause a subsequent concentric ring of bags to be cleaned with each successive full revolution of the sweep arm.

A further object of the invention is to provide a cylindrical baghouse of the character described which is rugged and durable in construction and economical in manufacture. Reliability and ease of maintenance are also significant features of this unit.

Yet another object of the invention is to provide a baghouse of the character described particularly adapted to the use of low pressure cleaning air. The sweep arm effectively seals against each filter mouth, one at a time, to dislodge dust cake with low pressure air in a highly efficient manner.

DESCRIPTION OF THE DRAWINGS

In the accompanying drawings, which form a part of the specification and are to be read in conjunction therewith, and in which like reference numerals are employed to indicate like parts in the various views.

Figure 1:
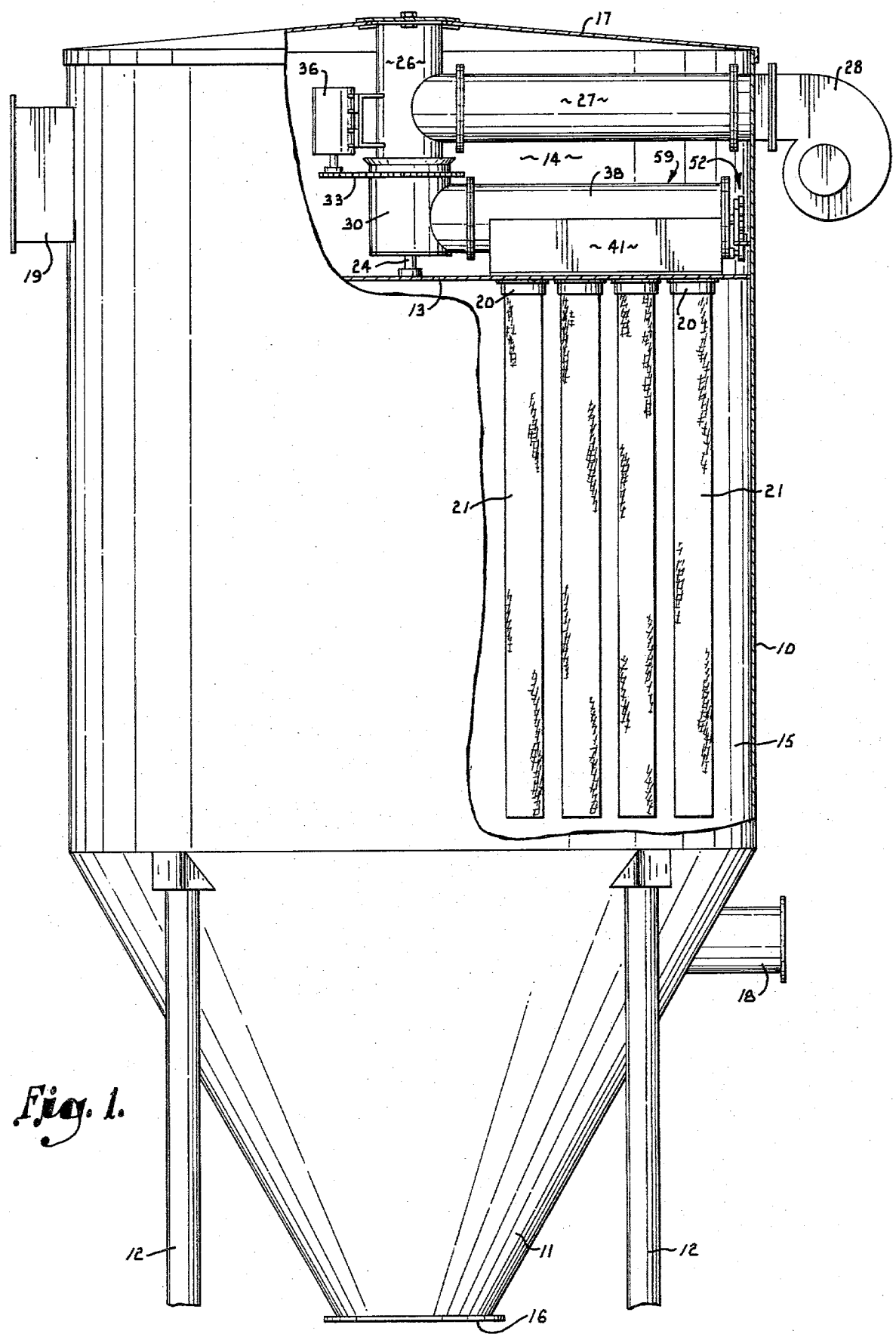
FIG. 1 is a side elevational view of a baghouse constructed in accordance with a preferred embodiment of the invention with parts thereof broken away to better illustrate the details of the construction.

Referring to the drawings in greater detail, the baghouse generally comprises a sheet metal housing having a cylindrical upper section 10 joined to a lower, conical section 11. The structure is conventionally supported by a plurality of legs 12 or supporting framework. Interiorly of the baghouse is secured a horizontally disposed, circular tube sheet 13 dividing the baghouse into two chambers or plenums. The zone above the tube sheet 13 is referred to as the clean air plenum 14, and the zone beneath the tube sheet 13 is the dirty air plenum 15. Within the dirty air plenum 15, dust cake collected in the hopper section 11 may be discharged through a removable access door 16. A rain cover 17 closes the cylindrical section 10 to provide a roof for the unit. The dirty air plenum 15 is equipped with an intake port 18 for receiving a particulate-laden gas stream and the clean air plenum 14 is fitted with a discharge port 19 for the exhaust of filtered gas.

Figure 2:
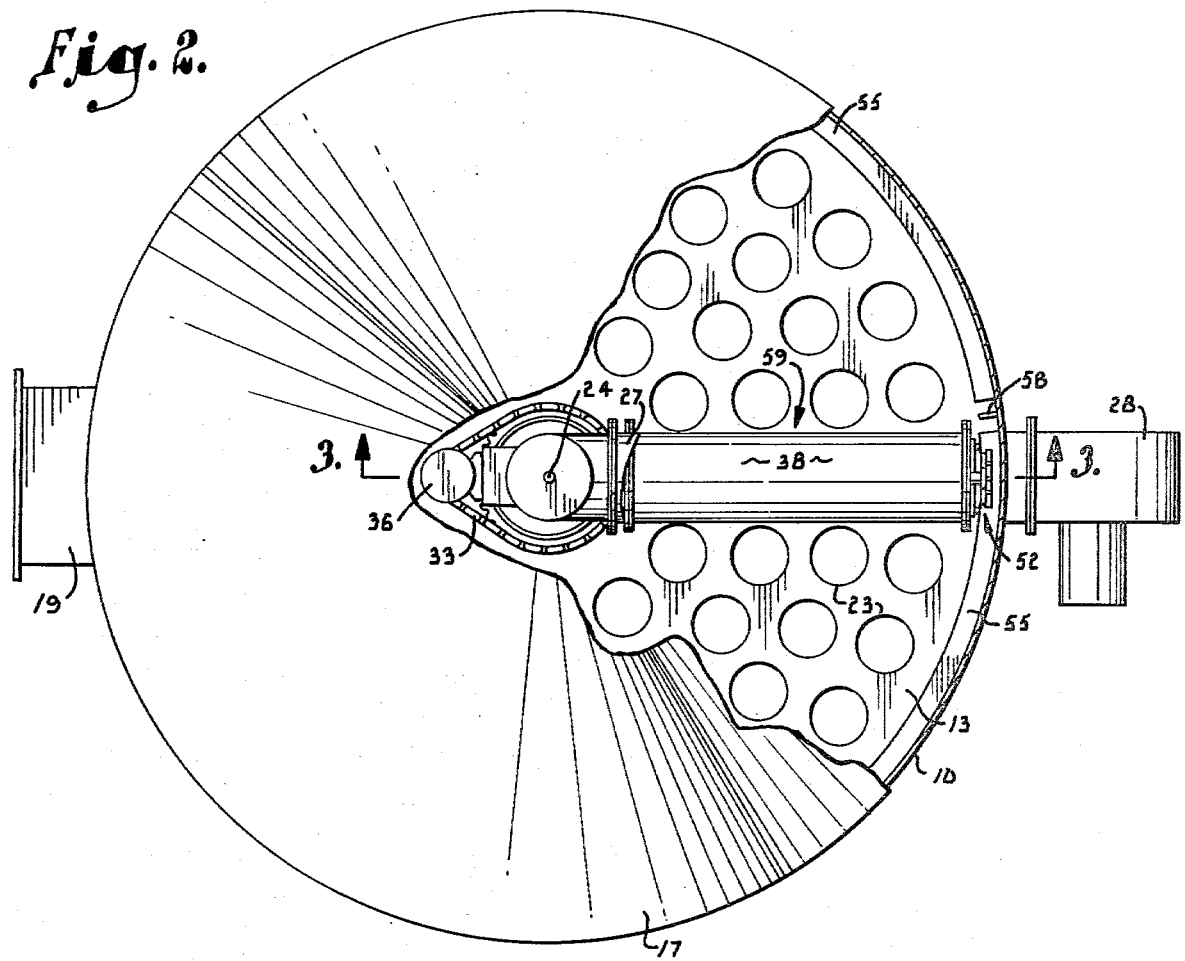
FIG. 2 is a top plan view of the baghouse with a portion of the top closure broken away to illustrate the sweep arm and the arrangement of filter bags in the tube sheet.
Figure 3:
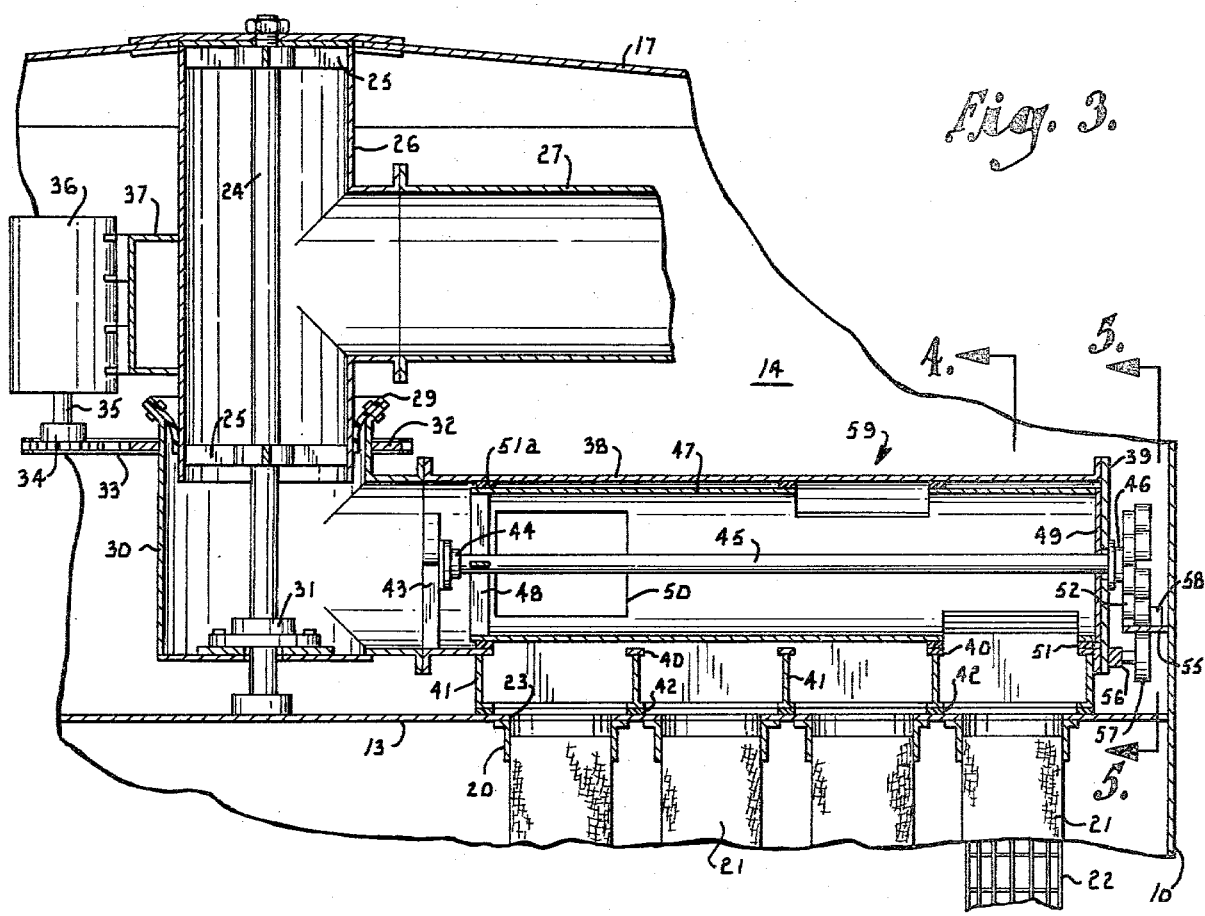
FIG. 3 is an enlarged, fragmentary side elevational view taken along line 3—3 of FIG. 2 in the direction of the arrows.
Figure 4:
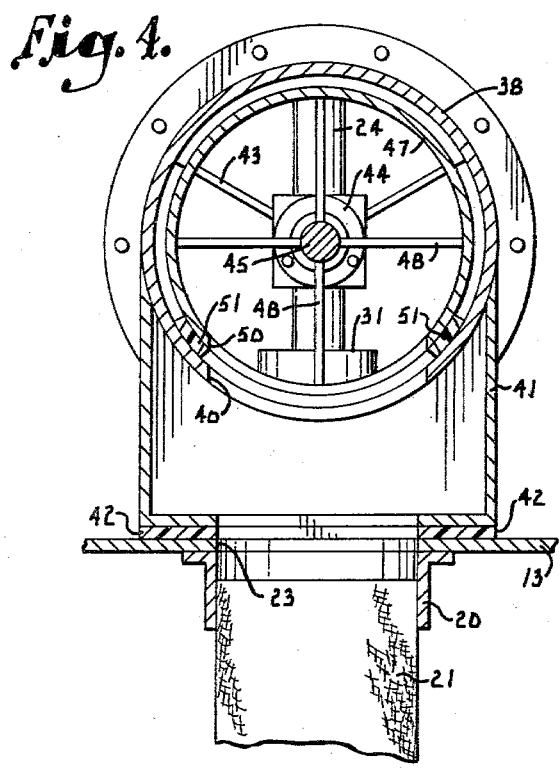
FIG. 4 is an enlarged elevational view taken along line 4—4 of FIG. 3 in the direction of the arrows.

As shown in FIG. 3, cylindrical flanges 20 are secured to the underside of the tube sheet 13 to receive elongate bags 21 having interiorly disposed wire cages 22 for skeletal support. Each filter bag 21 registers with a uniform circular opening 23 through the tube sheet 13. The bags 21 are arranged in concentric rings on preselected radii from the center of the tube sheet 13. The number of concentric rings may be varied according to the capacity of the unit. The four rings shown in the drawings are for illustrative purposes. It should be noted, however, as shown with reference to FIG. 2, that the filter bags 21 and openings 23 need not be aligned along common radials from the center of the tube sheet. Such permits maximum utilization of the available tube sheet area to achieve minimal spacing between adjacent bags for appropriate clearances for air flows within the dirty air plenum. By way of example, utilizing standard six inch bags, a total of twelve bags can be arranged in the innermost ring on a sixteen inch radius, eighteen bags in the second ring on a twenty-four inch radius, twenty-four bags in the third ring on a thirty-two inch radius and twenty-eight bags in the fourth outermost ring on a forty inch radius. Practical limitations on equipment size require that the number of concentric rings lie in range of two or more but twelve or less.

The balance of the structure relates to the cleaning mechanism to backflush the filters 21, one at a time, with pressurized cleaning air. Referring to FIG. 3 particularly, a vertical shaft 24 is secured between the roof 17 and the tube sheet 13 and corresponds to the longitudinal axis of the filter unit. Mounted on upper and lower support framework 25 from the shaft 24 is a T-shaped conduit 26. The leg of the T-shaped conduit 26 is flanged to a horizontal conduit 27 for delivering cleaning air from a blower 28 mounted on the outside of the clean air plenum 14 (FIG. 1). The lower, straight-run section of the T-shaped conduit 26 penetrates a flexible collar 29 and is received within a 90° elbow 30 mounted to the vertical shaft 24 by bearings 31 to permit full rotation therearound. On the upper section of the elbow 30 is fixed a peripheral sprocket 32 engaged by a chain 33 which likewise engages a drive sprocket 34 mounted on the output shaft 35 of a motor 36 secured by a mount 37 to the straight-run section of the T-shaped conduit 26.

Flanged to the horizontal section of the elbow 30, a cylindrical barrel 38 extends outwardly and terminates short of the cylindrical wall 10 of the filter unit, being closed by a circular end plate 39. On the lower surface of the cylindrical barrel are a plurality of discharge openings 40 aligned above the concentric rings of bags 23 in the tube sheet 13, one of said discharge openings 40 being positioned above each one of said concentric bag rings. Secured to the lower surface of the cylindrical barrel 38 and extending downwardly to the tube sheet 13 is a sectioned discharge conduit 41 having a section aligned with each of the concentric bag rings. The bottom surface of the discharge section 41 is rimmed with sealing strips or gasket material 42 to slidably and sealingly engage the upper surface of the tube sheet 13.

Interiorly of the cylindrical barrel 38, near the inner end thereof, is fitted a centering bracket 43 which carries by bearing 44 a horizontal rotatable shaft 45 running the length of the cylindrical barrel 38 and extending through the end plate 39 to be received by bearing 46.

Disposed within the cylindrical barrel 38 is a cylindrical valve body 47 mounted to the horizontal shaft 45 at its inner end by support bars 48 and at its outer end by a circular end plate 49 secured to the horizontal shaft 45. Rotation of the horizontal shaft 45 therefore results in rotation of the valve body 47. A plurality of discharge openings 50 are provided through the cylindrical surface of the valve body 47 and correspond in number to the number of concentric rings in the tube sheet 13. Thus, as illustrated in the drawings, the valve body 47 contains four such discharge openings 50, each oriented at 90° around the rotational axis of the valve body 47 and one each of said discharge openings 50 longitudinally positioned along the valve body 47 to register with a discharge mouth 40 of the cylindrical barrel 38. If, for example, six rings of filters are installed in the tube sheet 13, instead of the four illustrated in the drawings, then the discharge openings 50 in the valve body 47 would total six in number and would be angularly oriented around said valve body 47 at 60° (360°÷6). Sealing strips or gaskets 51 are secured to the valve body 47 to peripherally line the discharge openings 50 in the annulus between the internal bore of the cylindrical barrel 38 and the exterior surface of the valve body 47. Such gaskets 51 provide sliding and sealing engagement of the valve body 47 with the internal bore of the cylindrical barrel 38. The inner end of the valve body 47 also has a continuous seal ring 51a with the barrel 38 so cleaning air is delivered only to the internal bore of the valve body 47.

Figure 5:
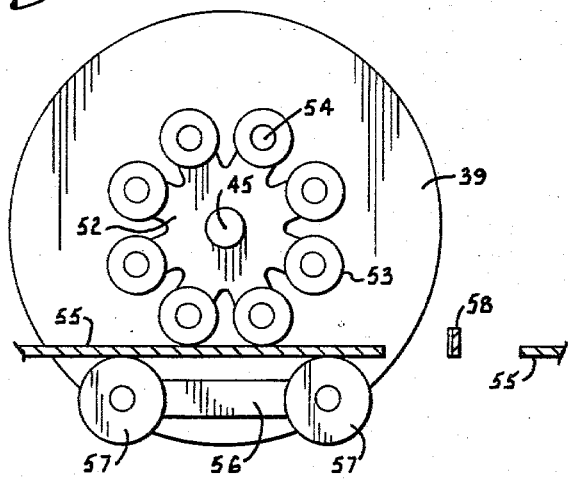
FIG. 5 is an enlarged end view of the sweep arm taken along line 5—5 of FIG. 3 in the direction of the arrows and illustrating the cam sprocket on the end of the sweep arm moving from left to right towards a cam lobe.
Figure 6:
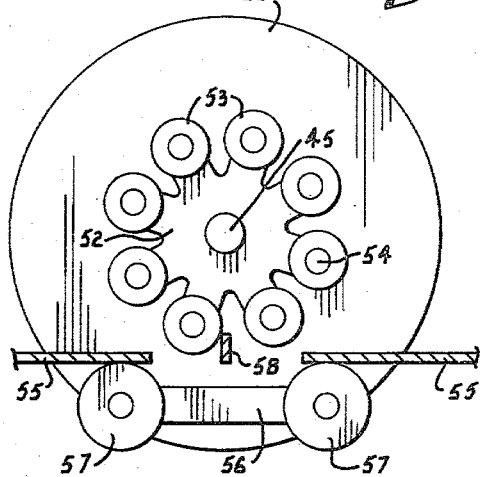
FIG. 6 is an end view of the sweep arm, similar to FIG. 5, showing the cam sprocket in engagement with the cam lobe in the process of rotating the valve body within the sweep arm to a new position.
Figure 7:
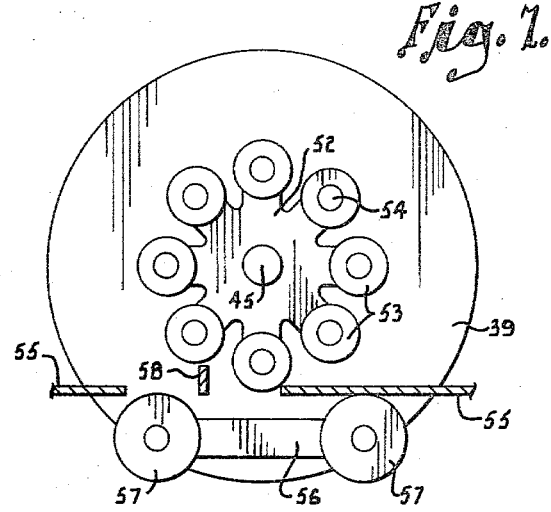
FIG. 7 is an end view of the sweep arm, similar to FIGS. 5 and 6, showing the cam sprocket disengaging the cam lobe and about to return to the cam track.

Outwardly of the end plate 39 of the cylindrical barrel 38, a cam disk or sprocket 52 is keyed to the horizontal shaft. As illustrated in FIGS. 5-7, rollers 53 are mounted on horizontal projections 54 of the cam sprocket 52. In the preferred embodiment of the invention as illustrated, two rollers 53 are utilized for each position of the valve body 47. Accordingly, if four concentric rings of filters 21 are disposed in the tube sheet 13, the valve body 47 must provide for four rotative positions and the cam rollers 53 will total eight in number being arranged at 45° angular spacings on the cam sprocket 52. Thus, if six concentric rings of bags 21 were arranged on the tube sheet 13, the cam sprocket 52 would carry a total of twelve cam rollers 53 arranged on 30° (360÷ by 12) angular spacings on the cam sprocket 52.

Interiorly of the clean air plenum 14, a cam track 55 is secured to the cylindrical wall 10 of the filter unit to receive, in riding engagement thereon, paired cam rollers 53 of the cam sprocket 52.

Mounted to the end plate 39 of the cylindrical barrel 38 on a support bar 56 are a pair of biasing rollers 57 which engage the underside of the cam track 55 to insure contact between the upper surface of the cam track 55 and the cam rollers 53.

It should be noted that the cam track 55 is continuous around the periphery of the filter unit except at one location where the cam track 55 is broken as illustrated in FIGS. 5-7. Intermediate the ends of the cam track 55, a cam lobe 58 projects inwardly from the wall 10 of the clean air plenum 14 to intercept the path traveled by the cam rollers 53.

During operation, particulate laden gas enters the dirty air plenum 15. As the gas flows through the fabric of the filters, dust accumulates and forms a cake on the exterior surface of the bags 21. The clean gas flows upwardly through the center of the filter bags, out the discharge mouths 23 formed in the tube sheet 13 to the clean air plenum 14 and then out the exhaust port 19.

Cleaning air, for removal of the dust cake, is provided by the blower connected to the previously described conduits 27, 26 and 30 of the cleaning system. The motor 36 operates to drive the sweep arm 59 in a circular path over the tube sheet 13. Cleaning air is continuously delivered through one of the discharge openings 50 in the valve body 47 aligned with one of the concentric rings of bags. As the sweep arm 59 moves across the tube sheet surface, each bag 23 forming that particular ring will be successively sealed by one section of the discharge conduit 41 and cleaning air will flow into the associated filter bag 23 to billow it outwardly and dislodge the accumulated dust cake. Thus, with one complete revolution of the sweep arm 59, all filters bags associated with one of the concentric rings of bags will have been cleaned. During one complete revolution, one pair of the cam rollers 53 engage and ride on the cam track 55 around the periphery of the clean air plenum 14 as shown in FIG. 5 to maintain the valve body 47 in proper position.

When the sweep arm 59 reaches the location of the cam lobe 58 the first roller 53 of the pair engages the lobe 58 causing the cam sprocket 52 to turn with the next pair of rollers 53 rotated downwardly to engage the cam track 55. Such incremental rotation of the cam sprocket 52 causes the valve body 47 within the barrel 38 to rotate, orienting downwardly a different discharge opening 50 to deliver cleaning air to another ring of filters during the subsequent revolution of the sweep arm 59. With each complete revolution of the sweep arm, yet another ring of bags is cleaned. When the full revolutions of the sweep arm 59 equal the number of rings of filters, then all filters in the baghouse will have been cleaned once and the complete cycle is repeated.

From the foregoing it will be seen that this invention is one well adapted to attain all the ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for separating particulate matter from a gas stream, said apparatus comprising:
   a cylindrical housing;
   a substantially horizontal, circular partition disposed interiorly of said housing, thereby defining a first chamber above said partition and a second chamber beneath said partition, said partition having a plurality of uniform, circular openings therethrough, said circular openings being arranged in concentric rings outwardly from the center of said partition;
   an inlet conduit connected to said second chamber for directing a particulate laden gas stream into said second chamber;
   an outlet conduit communicating with said first chamber to exhaust gas therefrom;
   a plurality of vertically arranged cylindrical filters disposed in said second chamber and having open upper ends secured to said openings through said partition;
   a cleaning sweep arm pivotally mounted within said first chamber to rotate in a circular orbit over said partition;
   drive means coupled to said cleaning sweep arm to rotate said arm in a circular orbit over said partition;
   pressurized air supply means connected to said cleaning sweep arm to supply pressurized cleaning air thereto; and
   cam controlled valve means positioned and arranged with respect to said cleaning sweep arm to cause cleaning air to be delivered to one of said concentric rings of circular openings in said partition during a full revolution of said arm over said partition to thereby clean, one at a time, the filters in said one of said concentric rings, and then to cause cleaning air to be delivered through the circular openings, one at a time, of another of said concentric rings during the subsequent revolution of said arm.

2. Apparatus for separating particulate matter from a gas stream, said apparatus comprising:

a cylindrical housing;

a substantially horizontal, circular partition disposed interiorly of said housing, thereby defining a first chamber above said partition and a second chamber beneath said partition, said partition having a plurality of uniform, circular openings therethrough, said circular openings being arranged in N concentric rings outwardly from the center of said partition;

an inlet conduit connected to said second chamber for directing a particulate laden gas stream into said second chamber;

an outlet conduit communicating with said first chamber to exhaust gas therefrom;

a plurality of vertically arranged cylindrical filters disposed in said second chamber and having open upper ends secured to said openings through said partition;

a cleaning sweep arm pivotally mounted within first chamber to rotate in a circular orbit over said partition; said cleaning sweep arm comprising a cylindrical barrel, a rotatable valve body, and N discharge ports aligned with said N concentric rings of the openings through said partition;

drive means coupled to said cleaning sweep arm to rotate said arm in a circulate orbit over said partition;

pressurized air supply means connected to said cleaning sweep arm to supply pressurized cleaning air thereto; and cam control means positioned and arranged with respect to said valve body to cause cleaning air to be delivered through one of said discharge ports during a full revolution of said arm over said partition to thereby clean the filters, one at a time, in one of said concentric rings, and then to shift said valve body to cause cleaning air to be delivered through another of said discharge ports during the subsequent revolution of said arm.

3. The apparatus as in claim 2, said valve body being cylindrically shaped to sealingly fit within said barrel and having N discharge openings spaced longitudinally along said valve body to be registrable with said N concentric rings of openings through said partition, said N discharge openings being angularly spaced around the axis of said valve body on $360 \div N$ centers.

4. The apparatus as in claim 3, said cam means comprising a cam track mounted within said first chamber, a cam wheel coupled to said valve body to ride on said cam track, and a cam lobe mounted within said first chamber at a preselected location to contact said cam wheel with each full revolution of said arm.

5. The apparatus as in claim 4, said cam means comprising means to shift said valve body to N different positions.

6. The apparatus as in claim 5, said cam wheel including $2 \times N$ rollers to engage in pairs said cam track, said rollers mounted on said cam wheel at angular spacings of $360 \div (2 \times N)$.

7. The apparatus as in claim 2 wherein $2 \leq N \leq 12$.

* * * * *